United States Patent
Pasin et al.

[11] Patent Number: 5,947,493
[45] Date of Patent: Sep. 7, 1999

[54] CHILDREN'S WAGON FRONT BOLSTER

[75] Inventors: Mario A. Pasin, Hinsdale; Roger Tonelli, Elmwood Park, both of Ill.

[73] Assignee: Radio Flyer, Inc., Chicago, Ill.

[21] Appl. No.: 08/985,100

[22] Filed: Dec. 4, 1997

[51] Int. Cl.⁶ ..................................................... B62B 3/02
[52] U.S. Cl. ..................................... 280/47.34; 280/87.01
[58] Field of Search ........................... 280/87.01, 87.021, 280/87.041, 87.042, 87.043, 87.05, 47.34, 47.35, 47.36; 301/127

[56] References Cited

U.S. PATENT DOCUMENTS

| | | | |
|---|---|---|---|
| 1,689,682 | 10/1928 | Rainey | 280/87.01 |
| 1,782,330 | 11/1930 | Werlich | 280/87.01 |
| 2,565,848 | 8/1951 | Howard | 280/87.05 |
| 2,759,298 | 8/1956 | Ystenes | 301/127 |
| 3,100,120 | 8/1963 | Cleary | 280/87.01 |
| 3,236,539 | 2/1966 | Ketterer | 280/87.01 |
| 4,222,582 | 9/1980 | Tonelli et al. | |
| 4,744,575 | 5/1988 | Tonelli | |

*Primary Examiner*—J. J. Swann
*Assistant Examiner*—Frank Vanaman
*Attorney, Agent, or Firm*—Rudnick & Wolfe

[57] ABSTRACT

A children's wagon front bolster with means especially adapted for accommodating a wagon handle attached to the bolster. The handle is adapted to be folded beneath the wagon body whereby the wagon assumes a compact form for packaging, storage and transportation of the wagon. The support for pivotally attaching the handle to the wagon body comprises a stationary turntable secured to the wagon body. A bolster central section is mounted on the turntable for rotation relative to the turntable, and the bolster has end sections on opposite sides of the central section with an axle extending between and supported by the end sections. The bolster also has a front section with the handle being pivotally attached to this front section. The end sections of the bolster are spaced downwardly from the central section of the bolster, and the axle has opposite ends supported by the end sections. The axle also includes a central portion extending inwardly toward the central section of the bolster. Fastener means attach the central portion of the axle to the central section of the bolster. The wagon handle is thereby receivable by the central portion of the axle when the handle is pivoted beneath the wagon body.

4 Claims, 3 Drawing Sheets

CHILDREN'S WAGON FRONT BOLSTER

BACKGROUND OF THE INVENTION

This invention relates to coaster wagons and, in particular, to an improved front bolster employed therein.

As described in U.S. Pat. Nos. 4,222,582 and 4,744,575, children's coaster wagons have been constructed with a front bolster comprising a steering assembly mounted for rotational movement on a turntable fixed to the bottom side of the wagon body. The steering assembly extends forwardly from the wagon body, and a handle is pivotally connected to a forward portion of the assembly. The mounting of the steering assembly has been by way of positioning a circularly grooved portion of the uppermost surface of the steering assembly to accommodate a similarly grooved portion on a turntable mounted to the bottom of the wagon body. Openings in the assembly and in the turntable are thereby aligned, and the assembly and turntable are pivotally secured by a bolt inserted through the aligned openings allowing free rotational movement of the assembly about the vertical axis of the connecting bolt.

This assembly allows the wagon to be steered via the front wheels which are mounted for free rotational movement on the ends of an axle which extends cross-wise from the steering assembly. As explained in the aforesaid patents, the assembly lends itself to the use of safety features to avoid injury.

In these and other wagon designs, the handle associated with the front bolster is not easily accommodated. Specifically, unless the handle is removed, it prevents the wagon from assuming a compact form for packaging, storage and transporting of the wagon.

SUMMARY OF THE INVENTION

In accordance with this invention, the front bolster is designed with means especially adapted for accommodating the handle attached to the bolster. Specifically, the handle is adapted to be folded beneath the wagon body whereby the wagon assumes a compact form for packaging, storage and transportation of the wagon. For example, a wagon characterized by the features of this invention may be readily transported in the trunk of a car.

In particular, the support means for pivotally attaching the handle to the wagon body comprises a stationary turntable secured to the wagon body. A bolster having a central section is mounted on the turntable for rotation relative to the turntable, and the bolster has end sections on opposite sides of the central section with an axle extending between and supported by said end sections. The bolster also has a front section with the handle being pivotally attached to this front section.

The end sections of the bolster are spaced downwardly from the central section of the bolster, and the axle has opposite ends supported by the end sections. The axle also includes a central portion extending inwardly toward the central section of the bolster. Fastener means attach the central portion of the axle to the central section of the bolster. The wagon handle is thereby receivable by the central portion of the axle when the handle is pivoted beneath the wagon body.

BRIEF DESCRIPTION OF THE DRAWINGS

FIG. 2A is a detail view of a clasp used in the practice of the invention;

DESCRIPTION OF THE PREFERRED EMBODIMENT

Figure 2:
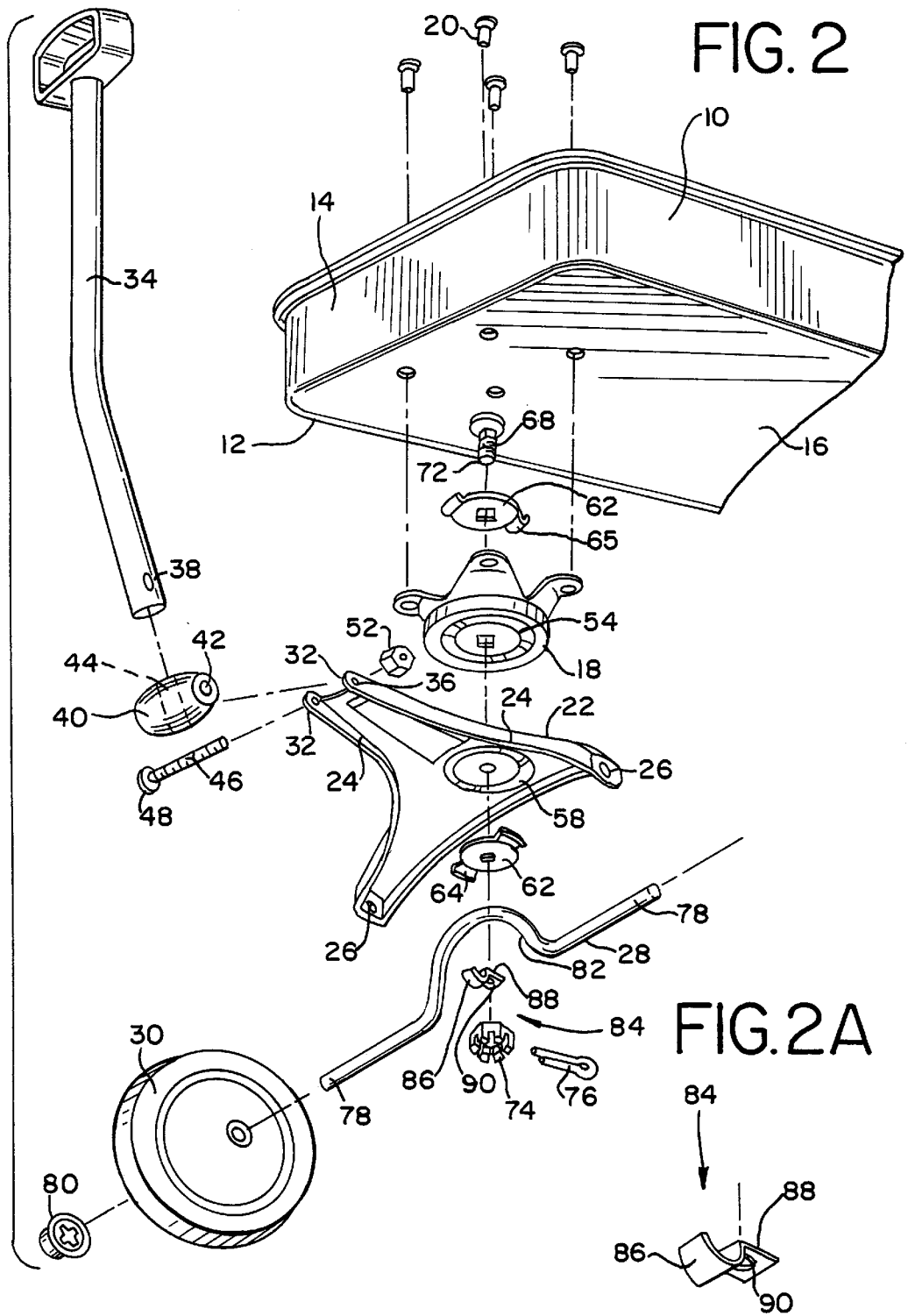
FIG. 2 is an exploded view of the wagon components.
Figure 3:
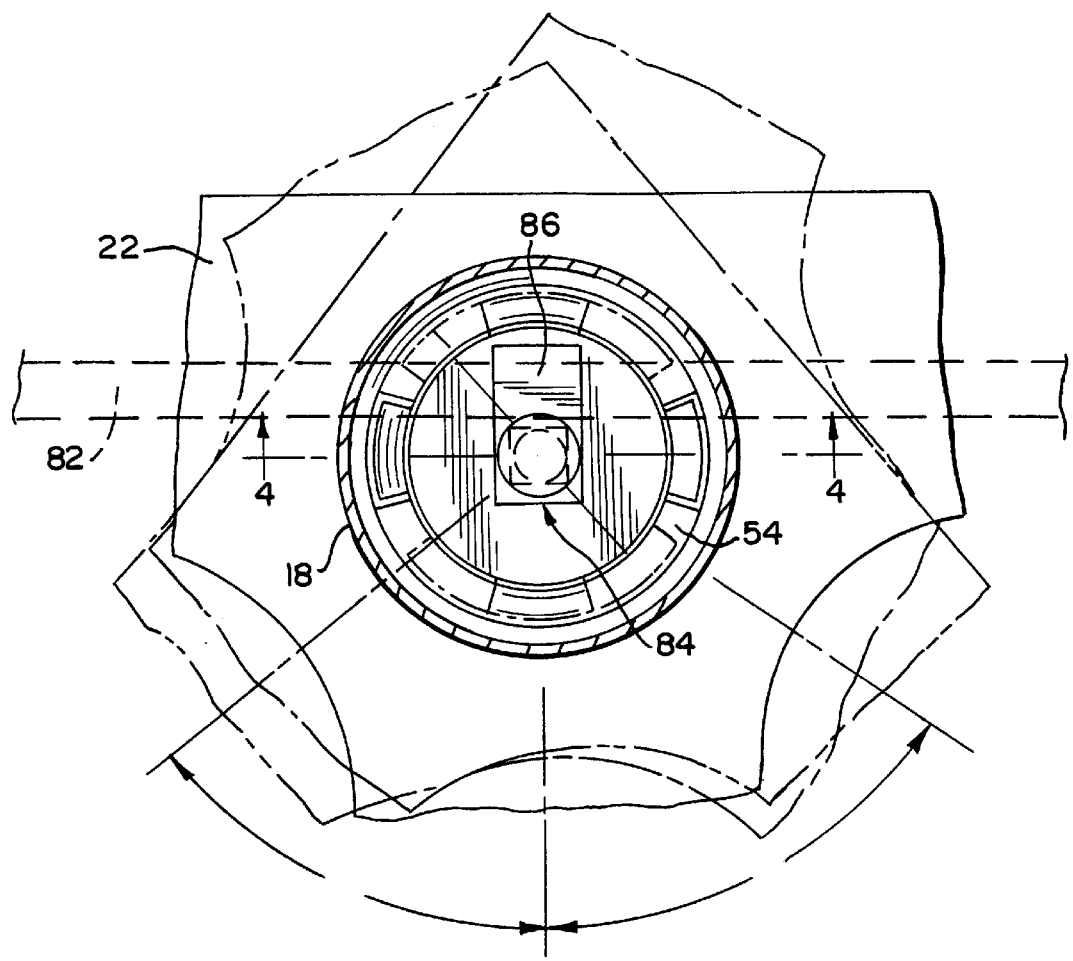
FIG. 3 is a fragmented bottom plan view of the assembled components.
Figure 4:
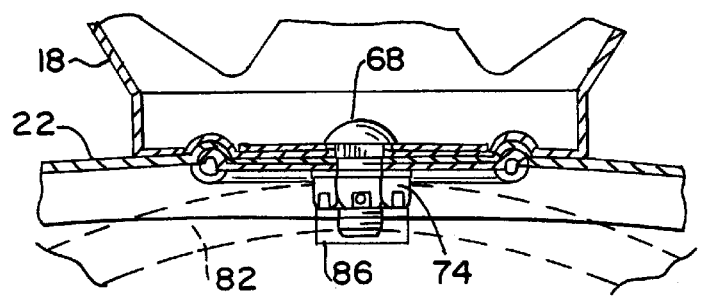
FIG. 4 is a cross sectional view taken about the line 4—4 of FIG. 3.

The drawings show the general layout of the coaster wagon 8 of the present invention, this layout being essentially as described in U.S. Pat. No. 4,744,575. Referring to FIG. 2, illustration is made of the front end portions of a coaster wagon having side walls 10 and 12, front end wall 14, and bottom 16. A turntable 18 is secured by screws 20 to the underside of the bottom 16 for mounting a steering assembly for rotational movement about a vertical axis relative thereto.

The steering assembly or bolster 22 is provided with laterally spaced-apart depending flanged portions 24 having crosswise aligned openings 26 through which a front axle 28 extends for mounting wheels 30 for free rotation on the end portions of the axle 28. The forward end portion of the bolster 22 extends beyond the front end wall 14 and below the bottom 16 with a pair of laterally spaced-apart tabs 32 extending forwardly as a yoke between which the handle 34 is mounted.

The tabs 32 are provided with crosswise aligned openings 36, and the end portion of the handle 34 is similarly provided with crosswise extending openings 38. A tubular member 40, preferably of elliptical shape, is provided with a passage 42 extending axially therethrough, all as described in the aforementioned '575 patent. Another passage (not shown) is formed midway between the ends of the tubular member 40 and extends radially into said member beyond the axis of passage 42 by the distance from the end of the handle 34 to the passage 38 extending therethrough.

The end of the handle 34 is inserted into passage 44 and the fastening bolt 46 is formed with a head 48 at one end dimensioned to be larger than the openings 36 and a threaded portion for threaded engagement by a fastening nut 52.

Also as described in the '575 patent, the bolster 22 is mounted to the turntable 18 so that rotational movement is hindered at two positions in the plane of rotation. In accordance with the practice of that invention, the bolster 22 is mounted on the turntable 18, forming a pair of tunnels, or enclosed tracks, by the joining of the circularly grooved tracks 54 and 58. Two identical washers 62 are provided for assembly purposes, and in mounting the bolster to turntable 18, one of the washers 62 is mounted on the surface of the turntable 18 which faces the bottom 16. Diametrically opposed curved flanged portions 64 and 65 of the washers protrude for interfitting with the stops provided by the turntable and bolster, respectively.

The bolster 22 and washers 62 are secured to the turntable 18 by a fastening bolt 68 extending through the washers 62, turntable and bolster. A threaded portion 72 on the through extending portion of the bolt is supplied for threaded engagement by a fastening nut 74, and cotter pin 76 maintains this connection.

In accordance with this invention, the bolster 18 and associated components will also accommodate the connection of axle 28. Thus, the bolster central section is mounted on the turntable in the manner described. The end sections of the bolster which define the openings 26 are spaced downwardly from the central section.

The axle 28 has axially straight, rod-shaped, oppositely disposed ends 78 which are receivable within the openings 26 for attachment of wheels 30 by means of standard fasteners 80. The axle also includes a rod shaped central portion 82 which is formed by oppositely positioned, curved portions resulting generally in the form of a semi-circle and which extends inwardly toward the central section of the bolster. A clasp 84 connects the central portion of the axle in assembly with the bolster.

Specifically, the clasp 84 includes a first curved end 86 which fits around the axle central portion 82. The second flat end 88 of the clasp defines an opening 90 which receives the fastening bolt 68.

Figure 1:
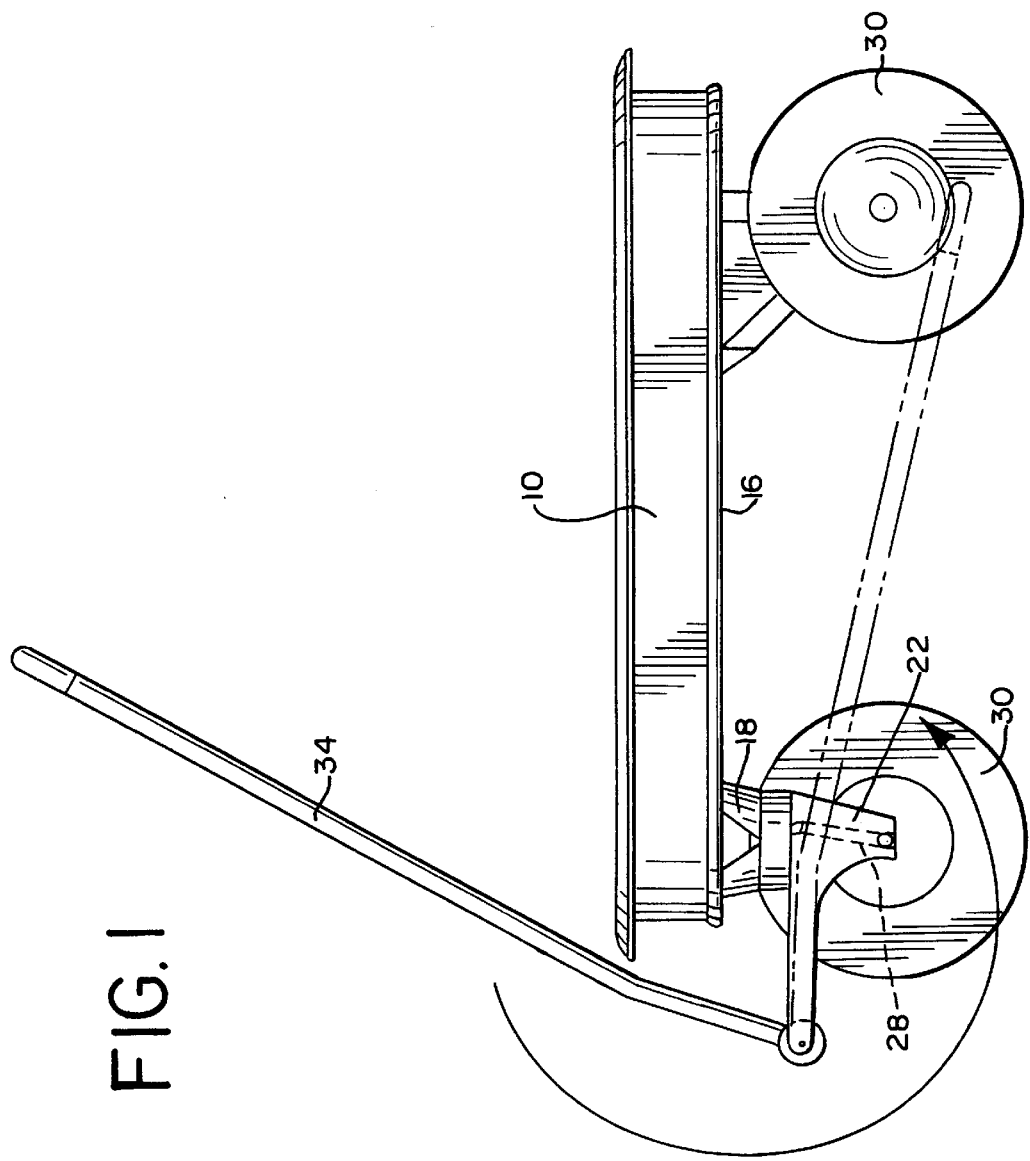
FIG. 1 is a side elevational view, partly cut away, of a children's wagon including the improved front bolster of this invention.

The arrangement described enables the function shown in FIG. 1. In this view, the forwardmost front wheel is not shown, and the axle 28 is shown in phantom. Because the axle design includes the central section 82, the handle 34 is adapted to be folded beneath the wagon making a most convenient arrangement for transporting and otherwise handling an assembled wagon, for example, in the trunk of a car.

The invention has been described in connection with the teachings of the aforementioned patents because it is especially useful in combination therewith. It will be appreciated, however, that the invention is also useful in combination with other wagon designs. It will also be understood that various additions to and modifications of the invention may be employed without departing from the spirit of the invention particularly as defined in the following claims.

That which is claimed:

1. A children's wagon consisting of a wagon body, a handle for use in propelling and steering the wagon, and support means for pivotally attaching the handle to the wagon body, said support means comprising a stationary turntable secured to the wagon body, a bolster having a central section positioned on the turntable for rotation relative to the turntable, a fastening bolt extending through said turntable and said bolster for holding the turntable and bolster together while permitting said rotation relative to the turntable, said bolt including a portion extending beneath said bolster, said bolster having end sections on opposite sides of the central section, an axle extending between and supported by said end sections, said bolster having a front section located forwardly of said bolt, said handle being pivotally attached to said front section, said end sections of the bolster being spaced downwardly from the central section of the bolster, said axle defining opposite ends supported by said end sections, and said axle including a central portion extending inwardly toward said central section of the bolster, said ends of said axle comprising axially straight, rod-shaped portions and said central portion comprises oppositely positioned, curved rod-shaped portions, whereby said central portion generally forms a semi-circle, the spacing between the curved rod-shaped portions being sufficient to receive said handle, said central portion being positioned adjacent to and rearwardly of said portion of said bolt, and means restraining movement of said central portion relative to said central section, said handle being receivable by said central portion when said handle is pivoted beneath said wagon body.

2. A children's wagon according to claim 1 including a fastener securing said central portion of said axle to said bolster.

3. A children's wagon according to claim 2 wherein said fastener comprises a clasp attached to said bolster, said clasp having one end extending over said central portion to hold the central portion in position.

4. A children's wagon according to claim 3 including a central opening defined by said turntable, a central opening defined by said bolster for alignment with the central opening of the turntable, said bolt extending through the respective central openings for securing the bolster to the turntable while permitting relative rotation thereof, said clasp having a second end defining an opening, said bolt extending through said clasp opening for holding the clasp in position.

* * * * *